(12) United States Patent
Kravitch (10) Patent No.: US 9,938,123 B1
(45) Date of Patent: Apr. 10, 2018

(54) VALVE BOX LIFTER (71) Applicant: Nick C. Kravitch, Aliquippa, PA (US)

(72) Inventor: Nick C. Kravitch, Aliquippa, PA (US)

(*) Notice: Subject to any disclaimer, the term of this patent is extended or adjusted under 35 U.S.C. 154(b) by 1045 days.

(21) Appl. No.: 13/815,678

(22) Filed: Mar. 14, 2013

(51) Int. Cl.
B25B 3/00 (2006.01)
B66F 11/00 (2006.01)

(52) U.S. Cl.
CPC ................................. B66F 11/00 (2013.01)

(58) Field of Classification Search
CPC ............... B25B 1/00; B25B 3/00; B25B 7/00
USPC .................................... 29/252; 81/418–426.5
See application file for complete search history.

(56) References Cited

U.S. PATENT DOCUMENTS

| 1,212,822 | A | | 1/1917 | Schlepp | |
|---|---|---|---|---|---|
| 1,330,487 | A | | 2/1920 | Mullen | |
| 1,506,032 | A | * | 8/1924 | Stevens | A61B 17/0206 600/219 |
| 1,716,849 | A | | 6/1929 | Culp | |
| 2,280,005 | A | | 4/1942 | Petersen | |
| 2,514,130 | A | | 7/1950 | Jones | |
| 2,803,320 | A | * | 8/1957 | Wagner | B25B 7/02 52/211 |
| 4,220,366 | A | | 9/1980 | Trudell | |
| D261,722 | S | * | 11/1981 | Rocheleau | D8/22 |
| 4,305,575 | A | * | 12/1981 | Bardes | B25B 5/142 269/228 |
| 4,344,215 | A | * | 8/1982 | Dearman | B25B 5/12 228/49.3 |
| 4,378,937 | A | * | 4/1983 | Dearman | B23K 37/0533 269/203 |
| 4,483,059 | A | * | 11/1984 | Dearman | B23K 37/0533 228/49.3 |
| 4,650,232 | A | | 3/1987 | Perry | |
| 4,673,174 | A | * | 6/1987 | Tabbert | B25B 5/04 269/228 |
| 4,747,588 | A | * | 5/1988 | Dillhoff | B25B 5/12 269/258 |
| D297,103 | S | * | 8/1988 | Parish, Sr. | D8/52 |
| 4,776,079 | A | * | 10/1988 | Cameron | B25B 5/12 29/268 |
| 4,850,254 | A | | 7/1989 | Burney | |

(Continued)

OTHER PUBLICATIONS

Pollardwaterdotcom Catalogue, pp. 37-39, 470, 2008 Edition, Pollardwaterdotcom, New Hyde Park, New York.

(Continued)

Primary Examiner — Lee D Wilson
(74) Attorney, Agent, or Firm — Price & Adams P.C.

(57) ABSTRACT

A gripping mechanism extends from a clamping mechanism. The clamping mechanism includes a fixed handle, a pivotally connected movable handle, a releasable locking mechanism, and the upper section of two opposing L-shaped arms. The lower section of each arm extends from the clamping mechanism to connect to a pair of lugs to form the gripping mechanism. Each lug includes an elongated member and a gripping surface for gripping a valve box cover lid. The gripping mechanism is manipulated to pivot the arms and move the gripping surfaces into place to grip the valve box cover lid. Once the gripping surfaces grip the lid, the arms are locked into a fixed position relative to one another to facilitate the separation of the cover, the lifting of the cover, and the transportation of the cover from the valve box.

17 Claims, 9 Drawing Sheets

(56) References Cited

U.S. PATENT DOCUMENTS

| | | | | |
|---|---|---|---|---|
| 4,944,204 A * | 7/1990 | West | ................ | B25B 7/22 81/385 |
| 5,163,792 A * | 11/1992 | Slavik | ................ | B23B 47/281 408/104 |
| 5,209,755 A * | 5/1993 | Abrahan | ................ | A61B 17/322 606/1 |
| 5,234,029 A * | 8/1993 | Thomas | ................ | F16K 27/006 137/364 |
| 5,281,223 A * | 1/1994 | Ray | ................ | A61B 17/025 606/279 |
| 5,322,396 A * | 6/1994 | Blacker | ................ | B23B 47/287 408/72 R |
| 5,421,073 A * | 6/1995 | Johnson | ................ | B25B 27/30 29/228 |
| 5,507,206 A * | 4/1996 | Solski | ................ | B25B 25/005 29/252 |
| 5,529,087 A * | 6/1996 | Berry | ................ | F16K 27/067 137/315.41 |
| 5,590,923 A * | 1/1997 | Berger | ................ | B25J 1/04 294/116 |
| 5,634,488 A * | 6/1997 | Martin, Jr. | ................ | F16L 59/168 137/364 |
| 5,800,099 A * | 9/1998 | Cooper | ................ | B23B 47/281 408/1 R |
| 5,937,716 A | 8/1999 | Klann | | |
| 6,000,686 A * | 12/1999 | Yates | ................ | B25B 5/12 269/143 |
| 6,009,608 A * | 1/2000 | Peckham | ................ | B25B 7/02 29/268 |
| 6,029,330 A * | 2/2000 | Ratia, Jr. | ................ | B25B 7/02 257/E23.086 |
| 6,175,998 B1 * | 1/2001 | Leo | ................ | B25B 7/02 29/268 |
| 6,261,296 B1 * | 7/2001 | Aebi | ................ | A61B 17/025 600/219 |
| 6,311,589 B1 * | 11/2001 | Schmitt | ................ | B25B 7/02 269/902 |
| 6,327,944 B1 * | 12/2001 | Liao | ................ | B25B 7/02 30/260 |
| 6,389,937 B1 * | 5/2002 | Kang | ................ | B25B 7/04 81/423 |
| 6,547,296 B1 | 4/2003 | Perkitney et al. | | |
| 6,551,316 B1 * | 4/2003 | Rinner | ................ | A61B 17/8866 606/205 |
| 6,595,566 B1 | 7/2003 | Donnan | | |
| 6,964,407 B1 | 11/2005 | Butler | | |
| 6,966,123 B1 * | 11/2005 | Rubino | ................ | B25B 5/06 269/283 |
| 7,036,859 B1 * | 5/2006 | Liao | ................ | A47J 45/10 294/16 |
| 7,104,166 B1 * | 9/2006 | Wong | ................ | B25B 5/12 81/180.1 |
| 7,171,877 B2 * | 2/2007 | Mosey | ................ | B25B 7/02 81/424 |
| 7,226,047 B1 * | 6/2007 | Beauchamp | ................ | B23K 37/0533 269/43 |
| 7,497,150 B1 * | 3/2009 | Huang | ................ | B25B 27/205 81/302 |
| 7,665,782 B2 * | 2/2010 | Buzby | ................ | B25B 7/12 294/109 |
| 7,926,394 B1 * | 4/2011 | Gallagher | ................ | B23Q 3/06 269/6 |
| 8,137,351 B2 * | 3/2012 | Prandi | ................ | A61B 17/0682 606/75 |
| 2003/0005798 A1 * | 1/2003 | Kuchar | ................ | B25B 7/02 81/426 |
| 2004/0120762 A1 * | 6/2004 | Sondrup | ................ | E02D 29/1445 404/26 |
| 2006/0225789 A1 * | 10/2006 | Stehling | ................ | E03B 9/08 137/382.5 |
| 2010/0021279 A1 * | 1/2010 | Buzby | ................ | A47F 13/06 414/800 |
| 2015/0343610 A1 * | 12/2015 | St. Gelais | ................ | B25B 7/08 81/424.5 |

OTHER PUBLICATIONS

USABlueBook # 119 Catalogue, pp. 243, 243, 1320-1323, 1344, 1413, 2008 Edition, USABlueBook, Gurnee, Illinois.

* cited by examiner

VALVE BOX LIFTER

BACKGROUND OF THE INVENTION

1. Field of the Invention

This invention relates to a valve box lifter and, more particularly, to an apparatus and method for locking, separating, lifting, and transporting a cover from a valve box.

2. Description of the Related Art

A number of clamping tools have been suggested for the purpose of supporting sections of pipe, I-beams or the like. These devices are particularly useful for clamping pipes or beams for welding. In many cases the clamping members are mounted on a self-locking C-clamp.

An example of a universal clamping tool is disclosed in U.S. Pat. No. 4,747,588. The tool has a pair of generally C-shaped arms which support a pair of opposed L-shaped clamping members, one for each arm. Each clamping member has a long leg and a short leg which extends perpendicular to the long leg, and each clamping member is supported on one of the arms for pivotal movement about two axes.

Another example of a universal clamping tool is disclosed in U.S. Pat. Nos. 2,514,130 and 2,280,005. The tool is a conventional vise grip in which a releasable handle is pivotally connected to a fixed handle by a releasable locking mechanism.

U.S. Pat. No. 4,850,254 discloses a locking hand tool. The tool includes a clamping portion with a fixed handle, a movable handle, and a lever-locking means that hold the handles in a fixed position relative to one another. The tool also includes a gripping portion with a pair of adjustable jaws with one of the jaws being movable.

U.S. Pat. No. 5,937,716 discloses a tool having opposed handle members each operatively connected to a jaw. The first jaw comprises a central longitudinally extending member designed to engage the head of a bolt when the tool is locked in place. The second jaw comprises a U-shaped member having two forked portions positioned on opposite sides of the plane of the first jaw member and being spaced apart sufficiently to receive the nut of a bolt therebetween when the tool is locked in place. The tool also includes releasable locking means to lock the tool in place.

U.S. Pat. No. 6,547,296 discloses a disc handling tool having a pair of arms and a housing. The arms are pivotally mounted to the housing in spaced relation to each other. A first gripper is located adjacent a distal end of the first arm. A second gripper is located adjacent a distal end of the second arm. The first and second grippers fit about a peripheral edge of an associated disc with the grippers being tangential to the peripheral edge of the associated disc. A locking member is provided for locking at least one of the first and second arms in one end position in relation to the housing.

Some lifting devices include locking mechanisms or clamping tools. U.S. Pat. No. 7,036,859 discloses a lifting device for pots or pans. The lifting device includes a pair of pivotally coupled gripping jaws. The jaws are connected by an axle that allows the jaws to be rotated relative to one another. Each jaw includes a locking member to engage the outer surface of a pot or a pan. The lifting device also includes a latching device to hold the jaws at a position relative to one another.

U.S. Pat. No. 1,330,487 discloses a lifting device for lifting cans. The device includes a pair of arms with each arm including an elongated member. The arms are securely attached to each other to firmly support the jaws and to force them into engagement with a can surface.

U.S. Pat. No. 1,716,849 discloses a can lifter that includes handle members and gripping jaws. The jaws are forced towards each other to grip the can or away from each other to release the can. The lower ends of the jaws include horizontal members having sharpened edges.

U.S. Pat. No. 1,212,822 discloses a cuspidor carrier. The carrier includes a pair of interlocking, crossed levers and a pair of engaging jaws.

In many instances, a lifting tool is used to separate a manhole cover from the recessed surface that surrounds the manhole. Generally, these lifting tools do not include locking mechanisms or clamping devices. An example of a manhole cover lifter is disclosed in U.S. Pat. No. 4,650,232.

U.S. Pat. No. 6,595,566 discloses a manually operated manhole cover lifter. The lifter includes two substantially linear members connected by a pivot in the form of scissors or tongs. The lower end of each member has a hook adapted for engaging a cover recess and the upper end has a handle for manual engagement. The hook angles are selected together with the pivot to hook distance to provide secure engagement of the cover when the hooks are inserted into cover apertures.

U.S. Pat. No. 6,964,407 discloses a manhole cover lifter that includes an elongated arm having a handle on one end for being grasped and lifted upwardly by a user and on the other end a pair of hooks for placement on or under the edge of the manhole cover. Disposed intermediate the ends of the handle is a slidable downwardly extending hook member which is for placement on the side of the manhole cover opposite to the side of the manhole cover where the hooks are placed. The lifter includes a clip for locking the handle in place to facilitate storage.

Manhole cover lifters are not valve box or valve box cover lifters, which are utilized to service valve boxes in water, gas and sewer utilities. Such valve-boxes normally have sections, so that access to the valves can be accomplished through the valve-boxes. These valve-box sections are removed when maintenance is required on the valves, or road construction necessitates adjustment, or daily adjustments are made due to ground conditions. Normally, these valve-boxes can be anywhere from 10 inches to 3 or 4 feet below the surface of the ground.

U.S. Pat. No. 4,220,366 discloses a device for removing valve boxes that includes a pair of pivoted side frames. The frames are connected to one another with two pairs of linking bars. One pair includes two linking bars with each bar having a pair of members connected by a locking hinge. The device is not designed to separate a valve box cover from the valve box itself.

Valve box covers are commonly removed from valve boxes using devices that resemble ice tongs. Two different types of valve box cover lifters are disclosed on page 37 in the 2008 edition of the Pollardwater.com catalog from Pollardwater.com of New Hyde Park, N.Y.

The first type of lifter includes a pair of handles and jaws that are applied to frictionally grip a pair of opposed notches on the valve box cover. Pressure is maintained on the handles to keep the jaws engaged on the valve box cover. Once the pressure is removed, the cover becomes disengaged from the jaw.

The second type of lifter is the "cap snapper" valve box cover lifter. The cap snapper lifter is essentially a modified pry bar. It is used in applications where it is necessary to chop through ice and tar before removing the cover from the valve box.

Another example of a valve box cover lifter is disclosed on page 1320 in the 2008 edition of the USA Blue Book #119 Catalog by USA Blue Book of Gurnee, Ill. The tongs include two pivotally connected members connected at the middle of one another. Each member includes a grip at one end and a jaw at the other. The tongs do not lock.

Most of the above-described clamping tools, lifters, and manhole cover removers are unsuitable for removing the covers from valve boxes. The conventional valve box lifters are also unsuitable for removing covers from valve boxes. The conventional valve box cover lifters utilize either the ice tong principle or the pry bar principle. Accordingly, there is a need for an improved valve box cover lifter.

SUMMARY OF THE INVENTION

In accordance with the present invention there is provided a lifting device for removing a cover from a valve box. A clamp has a fixed handle, a movable handle, a releasable mechanism connecting the fixed handle to the movable handle, and a pair of legs extending therefrom. The movable handle pivots between an open position relative to the fixed handle to a closed position relative to the fixed handle. Each of the legs has a lug extending therefrom. Each lug includes an elongated member with a gripping surface thereon and a connecting member to connect the elongated member to one of the legs. The lug gripping surfaces engage the cover of the valve box, the releasable mechanism locks the fixed handle in the closed position to hold the legs into a fixed position relative to one another, and the clamp lifts the lugs to remove the valve box cover from the valve box.

Further in accordance with the present invention, there is provided a lifting apparatus for removing a cover from a valve box. A clamping mechanism has a gripping portion, a pair of lifting portions, and a connecting portion for connecting the gripping portion to the lifting portions. The gripping portion includes a fixed handle, a releasable handle pivotally connected to the gripping portion, and means for locking the releasable handle relative to the fixed handle. Each lifting portion has a flange extending therefrom. The connecting portion has a pair of legs extending from the gripping portion. Means for attaching the lifting portions to the legs are provided. The releasable handle is movable relative to the fixed handle to move the lifting portion flanges into and out of engagement with the cover. The releasable handle is movable relative to the fixed handle to hold the lifting portions in a fixed position relative to one another for engagement with the cover. The fixed handle is movable relative to the valve box with the lifting portion flanges engaged to the cover to separate the cover from the valve box.

Further in accordance with the present invention, there is provided a method for removing a cover from a valve box. A clamping mechanism with a pair of pivotally connected handles is provided. A pair of gripping members is extended from the pair of pivotally connected handles. The pair of handles is pivoted to move the gripping members between an open position and a closed position. The gripping members are positioned in the open position adjacent to the cover of the valve box. The pair of handles is pivoted to move the gripping members from the open position to the closed position so that the gripping members grip the cover of the valve box. The pair of handles is locked to hold the gripping members in the closed position engaging the cover of the valve box. The pair of handles is moved with the cover of the valve box engaged by the gripping members away from the valve box to remove the cover from the valve box.

Accordingly, a principal object of the present invention is to provide an improved apparatus for lifting valve box covers.

Another object of the present invention is to provide a clamping device that locks in place to facilitate the separation of a cover from a valve box.

Another object of the present invention is to provide a lifting device with pivoting members that grasp a valve box cover.

A further object of the present invention is to provide a lifting device for opening valve boxes.

These and other objects of the present invention will be more completely described and disclosed in the following specification, accompanying drawings, and appended claims.

DESCRIPTION OF THE PREFERRED EMBODIMENTS

The present invention is directed to a tool that is utilized to service water, gas and sewer utility lines. Such utility lines are buried in the ground or hidden in the walls of buildings. The utility lines utilize valves that are buried in streets, side walks, yards, fields, and other similar places to control the flow of fluids or electricity in the various types of utility systems.

Typically, the valves are buried in the ground to frustrate vandals and to keep from freezing. It takes time to access the valves. However, the security provided by this arrangement makes it worthwhile to the utility companies as well as to prevent freezing.

Valves are also placed in vaults, valve pits, or valve boxes. Vaults are small subterranean rooms that are human accessible that typically contain several valves or one very large valve. Valve pits are small, shallow vaults that are easily accessible by a person reaching into them. Valve boxes are essentially pipes with lids.

Valve vaults, pits, and boxes are covered with lids or covers to prevent people from falling into them. These lids are generally round and vary in size. The lids are kept in place by threads, usually in the lid or cover, or by the weight or depth of the lid itself.

Figure 1:
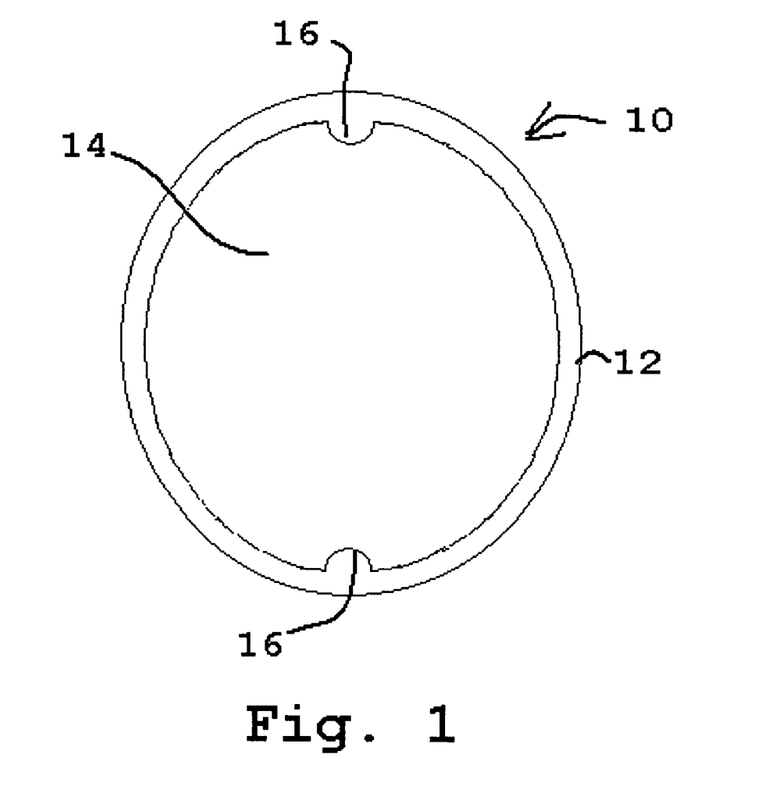
FIG. 1 is a top plan view of a valve box and a valve box cover.

Referring to the drawings and, particularly, to FIG. 1, there is shown a valve box generally designated by the numeral 10. The valve box 10 is an essentially tubular cylinder or pipe-like structure 12 with a lid or cover 14. The valve box cover 14 provides access to a valve (not shown) that is positioned within the pipe 12, usually below the ground. The typical valve box 10 varies in size from small to large.

Small valve boxes generally provide access to curb stops in which the valves turn on and turn off utility services to houses. Large valve boxes typically provide access to main line valves that turn on and turn off whole systems. Intermediate-sized valve boxes generally turn off utility services to houses, various system components, or entire systems.

Small valve boxes that contain curb stop valves typically have small lids that are attached with threaded members. The threaded members thread into the valve box or are bolted into the valve box. Alternatively, the valve box lid is sufficiently deep to add sufficient weight to the lid to keep the lid in place without additional fastening.

Smaller curb stop valve boxes (i.e. boxes with one inch or smaller valves) are usually connected to the lid using a threaded member, while larger curb stop valve boxes are usually connected to the lid through a bolt. Some smaller curb stop valve box lids are sufficiently light, so that they may be lifted out of the valve box manually. Most lids on larger curb stop valve boxes cannot be lifted manually.

Larger valve boxes that contain main line valves for lines for utility services for such facilities as manufacturing plants. Main line valves are two inches in size or greater, so that the valve boxes generally range in size from four inches to twelve inches. The lids for such large valve boxes are usually heavy enough to stay in place without additional fastening.

Typically, such valve boxes enclose valves that are two inches square (i.e. 2.8 inches across the diagonal). The valve operator utilizes a socket that has to be 3.5 inches across the diagonal. Consequently, the valve box must have a diameter of at least four inches.

As shown in FIG. 1, the valve box lid 14 is generally round. The lid 14 is held in place by its weight and geometry. The lid 14 includes a pair of circular notches 16 that are located 180 degrees apart from one another. A pair of lips or recesses (not shown) is positioned under the notches 16 to facilitate removal of the lid 14.

Figure 2:
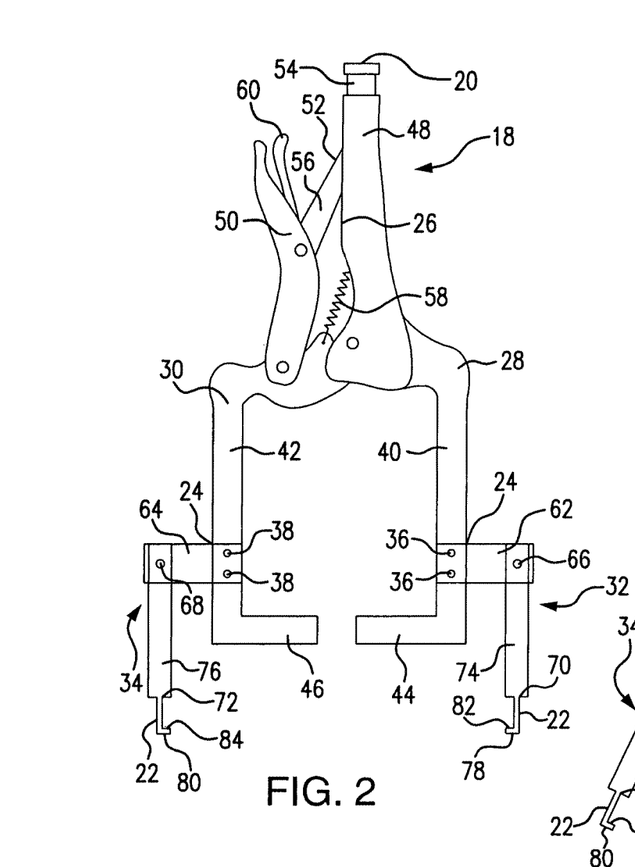
FIG. 2 is a view in side elevation of a valve box cover lifter in a closed position.
Figure 3:
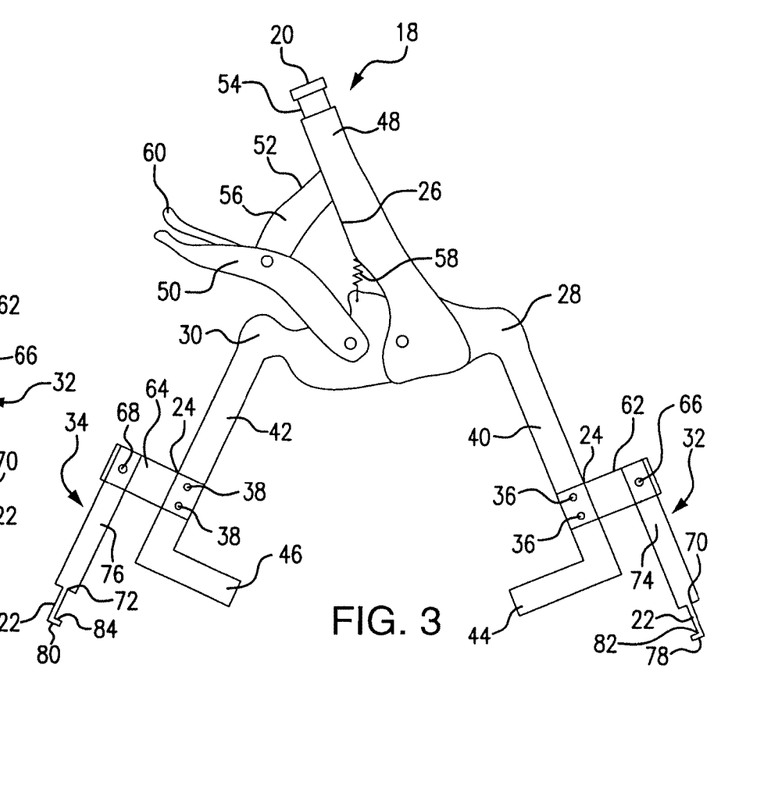
FIG. 3 is a view in side elevation of the valve box cover lifter shown in FIG. 2 in an open position.
Figure 4:
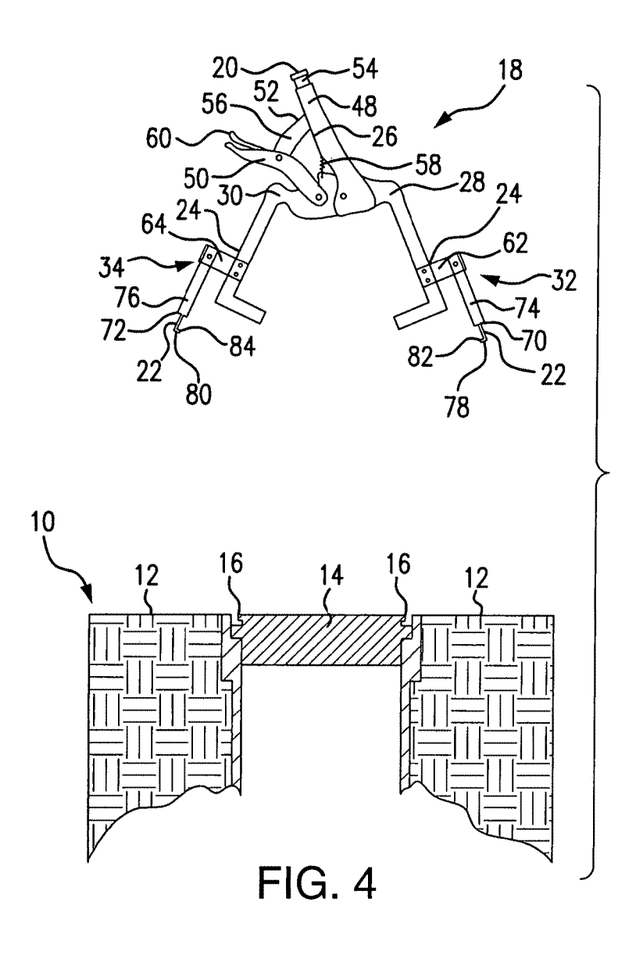
FIG. 4 is a view in side elevation of the valve box cover lifter shown in FIG. 2 in an overlying relation with a valve box and cover.
Figure 5:
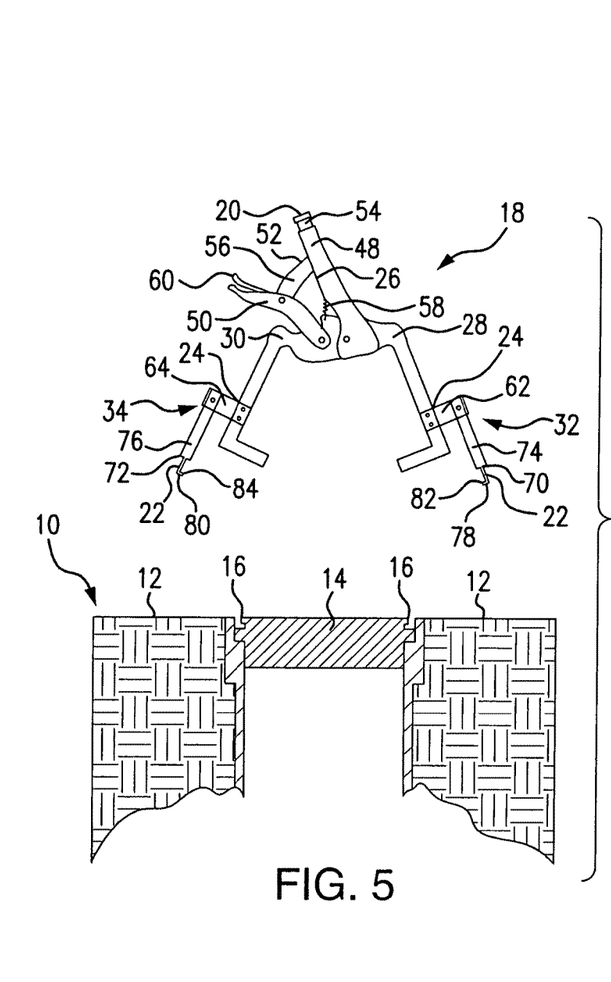
FIG. 5 is a view in side elevation of the valve box cover lifter shown in FIG. 2 as it is moved into position to engage a valve box cover.

Referring now to FIGS. 2-3, there is provided a valve box cover lifter generally designated by the numeral 18. The valve box cover lifter 18 includes a clamping portion 20, gripping or lifting portions 22, and a connecting portion 24 between the clamping portion 20 and the gripping portions 22. The gripping portions 22 extend outwardly from the clamping portion 20. The connecting portion 24 connects the gripping portions 22 to the clamping portion 20.

The clamping portion 20 includes a clamping mechanism or clamp 26. The clamping mechanism 26 is a suitable clamping mechanism, such as pliers, C clamps, or other suitable clamping mechanisms. Preferably, the clamping mechanism 26 is similar to the universal clamping tools that are disclosed in U.S. Pat. Nos. 2,514,130 and 2,280,005, which are commonly referred to as vise grips or vice grips.

Unlike conventional vice grips, the clamping mechanism 26 includes a pair of opposed, generally L-shaped legs or arms 28, 30 that extend downwardly to connect to a pair of lugs generally designated by the numerals 32, 34 in FIGS. 2-7. The lugs 32, 34 engage the valve box cover 14 shown in FIG. 1. The arms 28, 30 connect to the lugs 32, 34 through conventional fastening methods using conventional fasteners 36, 38 in a permanent or releasable manner or, in the alternative, are welded to the lugs 32, 34. Preferably, the arms 28, 30 have an identical configuration to one another and the lugs 32, 34 have an identical configuration to one another.

The dimensions of the legs 28, 30 and the lugs 32, 34 are not critical, and the clamping mechanism 26 has the ability to accommodate various sizes of legs 28, 30 and lugs 32, 34. Preferably, legs 28, 30 and the lugs 32, 34 have preselected dimensions to accommodate standard valve box cover sizes, such as the valve box cover 14 shown in FIG. 1.

As shown in FIGS. 2-3, each arm 28, 30 includes a long section 40, 42 and a short section 44, 46. Each short section 44, 46 extends from each long section 40, 42 in an essentially perpendicular direction. The opposed surfaces of the sections 40, 42, 44, 46 are, preferably, flat. Alternatively, the sections 40, 42, 44, 46 include gripping surfaces.

As shown in FIGS. 2-3, the clamp 26 includes a fixed handle 48, a movable handle 50, and a positive, releasable locking or actuating mechanism 52 between the fixed handle 48 and the movable handle 50. The locking mechanism 52 connects the fixed handle 48 to the movable handle 50. Preferably, the movable handle 48 is channeled, and the fixed handle 36 is essentially cylindrical with a screw device 54 extending therefrom. Preferably, both handles 48, 50 are substantially long, but the length of the handles 48, 50 is not critical.

The releasable locking mechanism 52 includes a bar 56, that pivotally connects the fixed handle 48 to the movable handle 50 and a tension spring 58. Preferably, the releasable locking mechanism 52 is a spring loaded quick disconnect mechanism.

The movable handle 50 is pivotally movable relative to the fixed handle 48 from an open position to a closed position. When the movable handle 50 is in the closed position, the releasable locking mechanism 52 is actuated. Upon actuation, the releasable locking mechanism 52 holds the moveable handle 50 in a fixed position relative to the fixed handle 48 when the moveable handle 50 is in the closed position.

The locking mechanism 52 also includes a release lever 60. The lever 60 is actuated to allow the movable handle 50 to pivot relative to the fixed handle 48 releasing the movable handle 50 from its fixed position. The lever 60 acts as a release for the locking mechanism 52. Preferably, the locking mechanism 52 is a spring-loaded locking mechanism.

As shown in FIGS. 2-3, the fixed handle 48 connects to the arm long section 40 and is essentially integral with the arm 28. The fixed handle 48 is pivotally attached to the long section 42 of the other arm 30, so that the other arm 30 rotates around the fixed handle 48 at least partially.

The long section 42 of the arm 30 is pivotally attached to the movable handle 50 at an intermediate position between the distal end of the long section 42 and the essentially perpendicular joint between the long section 42 and the short section 46. The exact location of the pivotal connection is not critical.

The long sections 40, 42, the fixed handle 48, the movable handle 50, and the locking mechanism 52 form the clamping portion 26. The pivotal connection between the fixed handle 48 and the movable handle 50 allows the lifter 18 to pivot from the closed position shown in FIG. 2 into the open position shown in FIG. 3. Preferably, the fixed handle 48 and the movable handle 50 are adjacent to one another, but the spacing between the handles 48, 50 is not critical.

The arms 28, 30 extend outwardly from the clamping portion 26. The arms 28, 30 are connected to a pair of members 62, 64 that project laterally therefrom to form the connecting portion 24. The members 62, 64 are essentially perpendicular to the arms 28, 30. The members 62, 64 connect to the arms 28, 30 through conventional fastening techniques using fasteners 36, 38 in a permanent or releasable manner.

Suitable fasteners include screws, bolts, or other similar devices. Alternatively, the members 62, 64 connect to the arms 28, 30 through joining methods, such as welding, adhesives, or other similar methods. Preferably, the members 62, 64 are riveted to the arms 28, 30.

As shown in FIGS. 2-3, the connecting portion 24 includes fasteners 66, 68 for connecting to the gripping portions 22. The gripping or lifting portions 22 include lifting mechanisms 70, 72 that connect to the members 62, 64. Each lifting mechanism 70, 72 includes an elongated portion 74, 76, a flanged portion 78, 80, and a gripping surface 82, 84. The gripping surfaces 82, 84 engage the valve box cover 14 shown in FIG. 1.

The gripping surface 82 is positioned on the elongated member flange 78 to form a claw. The gripping surface 84 is positioned on the elongated member flange 80 to form a claw. In operation, the gripping surfaces 82, 84 are inserted into the valve box 12 shown in FIG. 1 to engage the valve box cover notches 16.

As shown in FIGS. 2-3, the connecting portion 24 connects to the gripping portions 22 through conventional fastening methods utilizing rivets, bolts, screws, or other similar fasteners. Alternatively, the connecting portion 24 is welded or is otherwise joined to the gripping portions 22 through other suitable joining methods.

The components of the gripping portions 22, the legs 28, 30, the handles 48, 50 and the locking mechanism are made through any suitable manufacturing process. Preferably, the components of the gripping portions 22, the legs 28, 30, the handles 48,50 and the locking mechanism 52 are formed separately from separate materials and assembled into the lifter 18 through a series of conventional assembly steps.

The components of the gripping portions 22, the legs 28, 30, the handles 48,50 and the locking mechanism 52 are made from any suitable material, which may be a single material or a combination of suitable materials. Preferably, one or more of the component of gripping portions 22, the legs 28, 30, the handles 48, 50, and the locking mechanism 52 are made from a high strength material. The term "high strength material" should be understood to refer to any metal, ceramic, plastic, or composite that has strength and stiffness equal to or exceeding hardened tool steel.

Referring now to FIGS. 4-7, there is shown a sequence of steps for removing the valve box cover 14 from the valve box 10 using the valve box cover lifter 18. Initially, the valve box cover lifter 18 is positioned over the valve box 10 in an essentially vertical position with the gripping portions 22 extending downwardly from the clamping portion 20. An operator (not shown) grasps the clamping portion handles 48,50 to manipulate the valve box lifter 20.

The gripping surfaces 82, 84 extend from the gripping or lifting portions 22. As the lifter 18 is moved closer to the valve box 10, the handles 48, 50 are pivoted to move the gripping surfaces 82, 84 between an open position and a closed position. Preferably, the movable handle 50 is pivoted relative to the fixed handle 48.

The pivoting of the handles 48, 50 allow the gripping surfaces 82, 84 to be positioned in the open position. The gripping surfaces 82, 84 are manipulated for insertion into the cover notches 16 shown in FIG. 1. Upon insertion, the gripping surfaces 82, 84 are adjacent to the valve box cover 14, and the handles 48, 50 are pivoted to move the gripping surfaces 82, 84 from the open position to the closed position.

Figure 6:
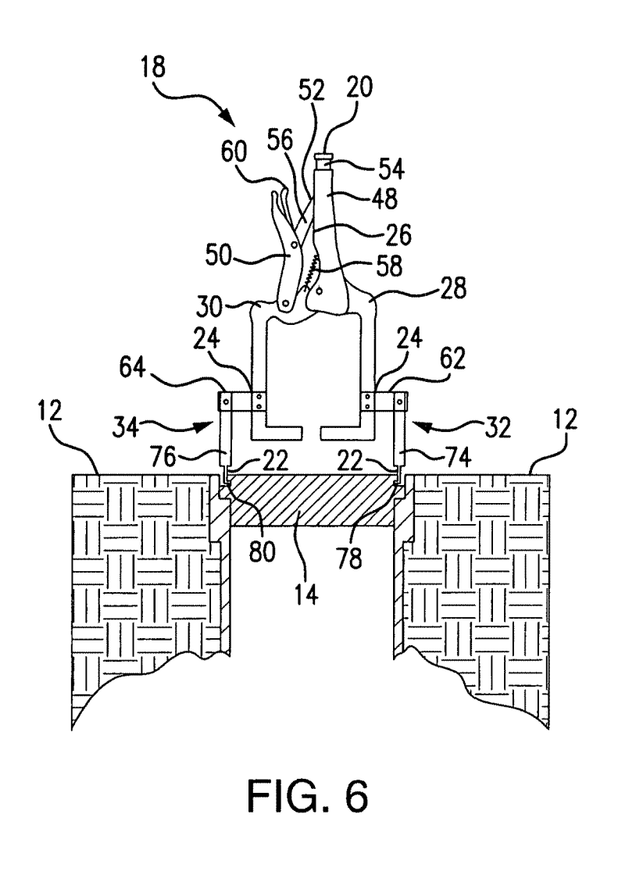
FIG. 6 is a view in side elevation of the valve box cover lifter shown in FIG. 2 engaging a valve box cover.
Figure 7:
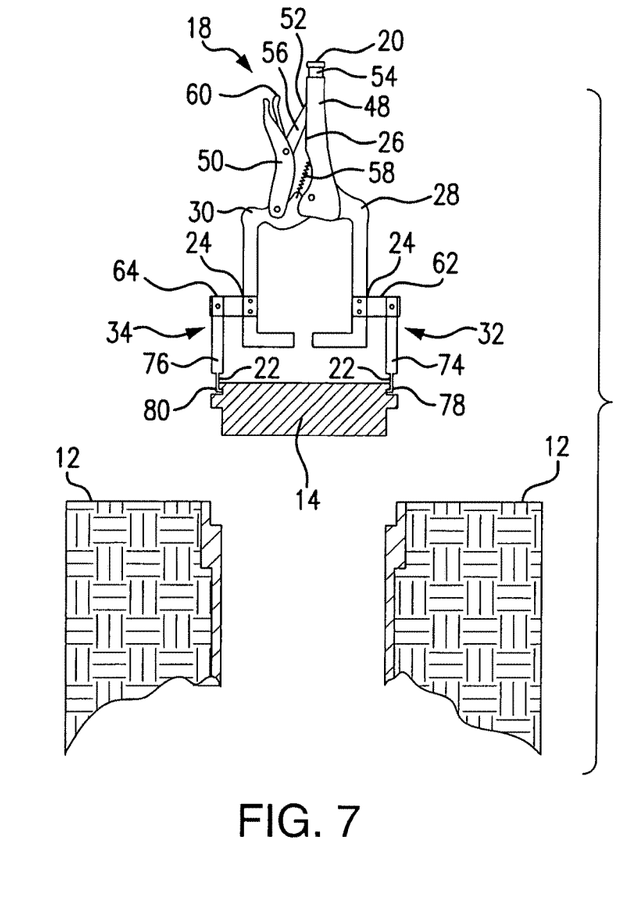
FIG. 7 is a view in side elevation of the valve box cover lifter shown in FIG. 2 lifting a valve box cover from a valve box.

As shown in FIGS. 6-7, the gripping surfaces 82, 84 grip the valve box cover 14 in the closed position. Preferably, the gripping surfaces 82, 84 include a gripping surface 82, 84 to facilitate the gripping of the valve box cover 14. Alternatively, the gripping surfaces 82, 84 include a gripping surface with a diamond pattern, a dimpled pattern, or any other similar pattern.

Once the gripping surfaces 82, 84 grip the valve box cover 14, the handles 48, 50 are locked to hold the gripping surfaces 82, 84 in the closed position. The gripping surfaces 82, 84 continue to engage the valve box cover 14 while in the closed position.

As shown in FIG. 7, the handles 48, 50 are moved to lift simultaneously the gripping surfaces 82, 84 and the valve box cover 14. The lifting of the valve box cover 14 separates the valve box cover 14 from the valve box 10, which breaks any sealed connection between the cover 14 and the box 10. The handles 48, 50 remain in a locked position to hold the gripping surfaces 82, 84 in a fixed position relative to one another, while engaging the valve box cover 14. Preferably, the gripping surfaces 82, 84 remain in a locked position while transporting the valve box cover 14 away from the valve box 10.

Figure 8:
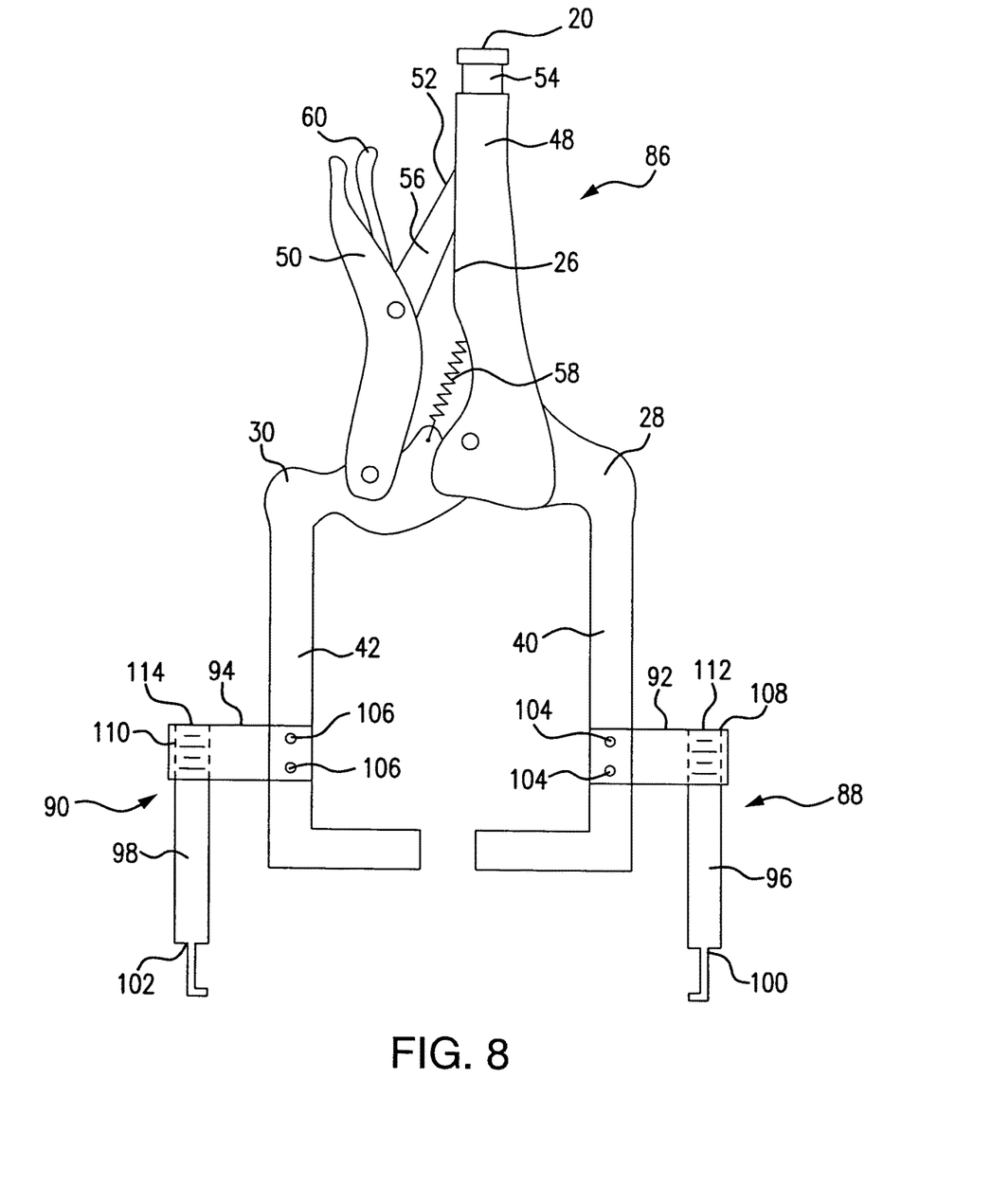
FIG. 8 is a view in side elevation of another embodiment of a valve box cover lifter.
Figure 9:
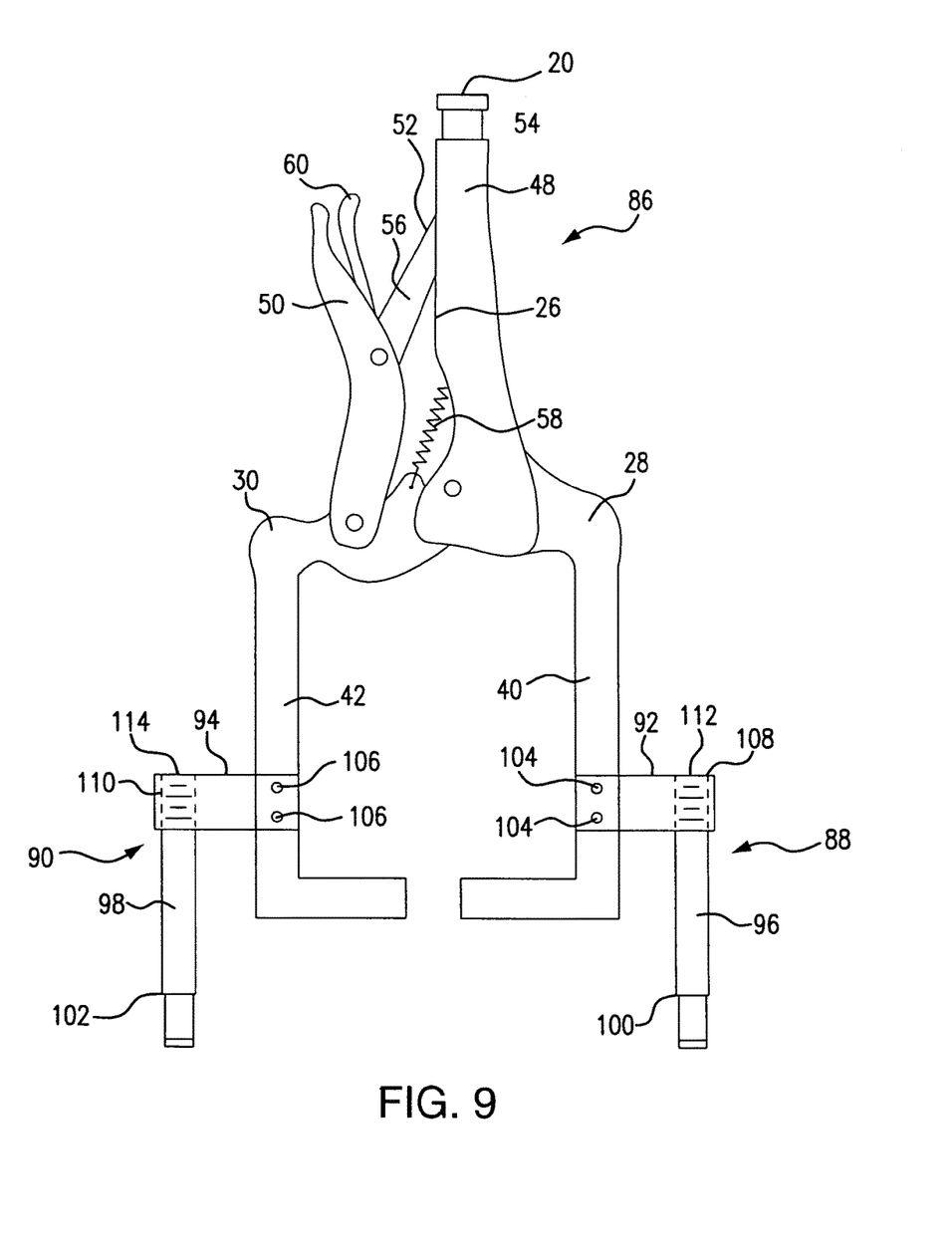
FIG. 9 is a view in side elevation of the embodiment of the valve box cover lifter shown in FIG. 8 in which the lugs are partially rotated.
Figure 10:
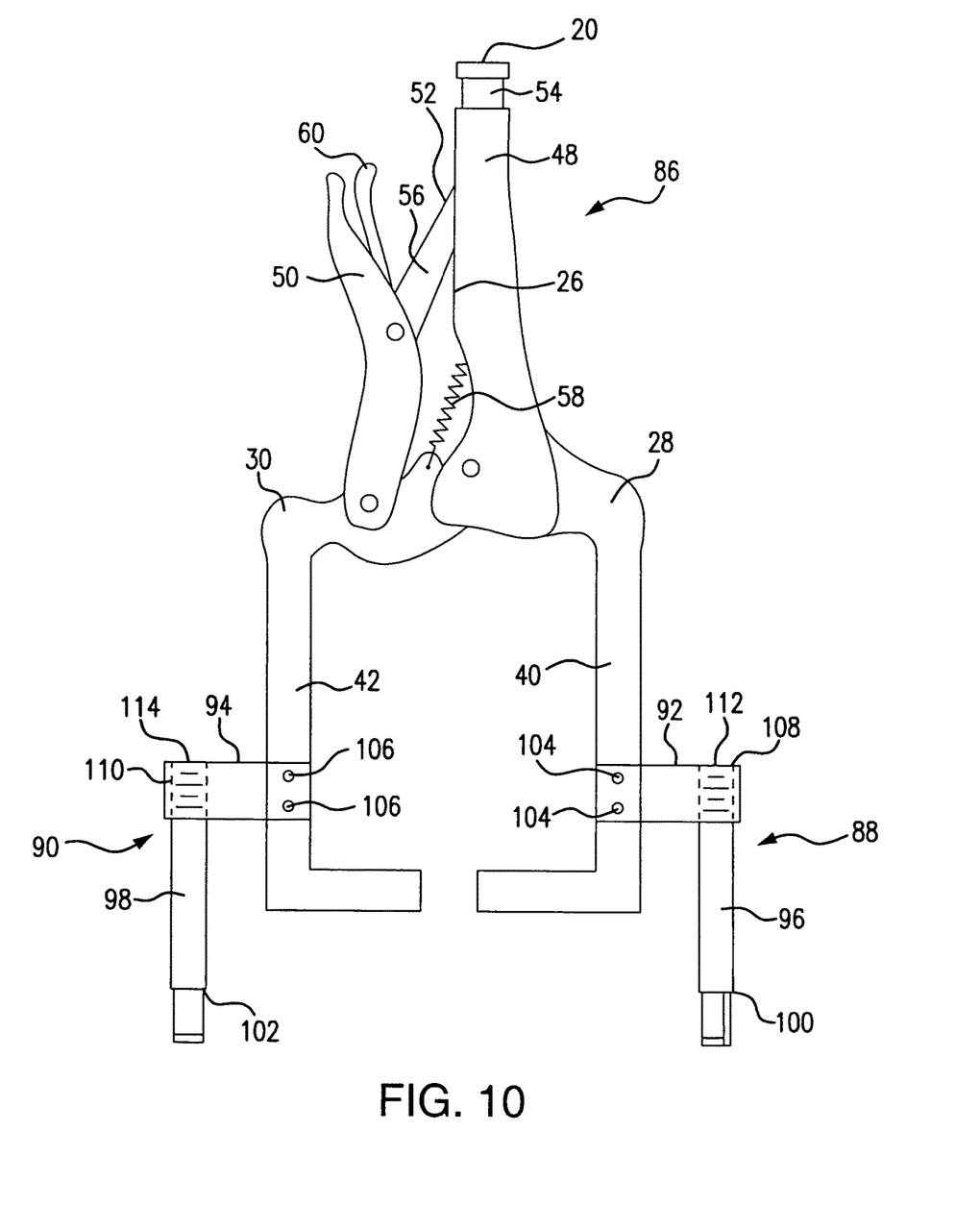
FIG. 10 is a view in side elevation of the embodiment of the valve box cover lifter shown in FIG. 8 in which the lugs are partially rotated.

Referring now to FIGS. 8-10, there is shown another embodiment of a valve box cover lifter generally designated by the numeral 86 in which like elements are identified by like numerals shown in FIGS. 1-7. The valve box lifter 86 includes a clamping portion 20 with a pair of opposing L-shaped legs 28, 30 extending downwardly therefrom.

Similar to the embodiments shown in FIGS. 2-7, each leg 28, 30 connects to lugs generally designated by the numerals 88, 90, as shown in FIGS. 8-10. The lugs 88, 90 have connecting members 92, 94, elongated members 96, 98, and gripping surfaces 100, 102. Preferably, the lugs 88, 90 are connected to the long sections 40, 42 of the legs 28, 30 through conventional connecting devices 104, 106 in a permanent or releasable manner.

Suitable connecting devices include screws, bolts, rivets or other similar fasteners. Alternatively, the fasteners are eliminated and the lugs 88, 90 connect to the long sections 40, 42 by welds, adhesives, or other joining methods or techniques. Preferably, the lugs 88, 90 connect to the long sections 40, 42 by rivets.

The connecting members 92, 94 shown in FIGS. 8-10 extend essentially perpendicularly from the long sections 40, 42 of the legs 28, 30 with each connecting member 92, 94 having an essentially vertical bore 108, 110 extending therethrough. Each bore 108, 110 threadedly connects to the upper sections 112, 114 of each elongated member 96, 98. Preferably, the outer surfaces of the upper sections 112, 114 are threaded, and the inner surface of each bore 108, 110 is configured to receive the outer surfaces of the upper sections 112, 114.

The elongated members 96, 98 are mounted for rotation within the bores 108, 110 to facilitate rotational positioning of the gripping surfaces 100, 102 on the valve box cover 14 shown in FIG. 1. Preferably, the elongated members 96, 98 have the ability to rotate from an initial position shown in FIG. 8 to an intermediate position shown in FIG. 9 to a final position shown in FIG. 10.

As shown in FIGS. 8-10, the rotation of the elongated members 96, 98 provides the valve box cover lifter 86 with the ability to position the gripping surfaces 100, 102 in various rotational configurations along a valve box cover surface (not shown). This feature is particularly advantageous when valve box cover surface notches (not shown) are not aligned in the preferred 180 degree configuration shown in FIG. 1.

The valve box cover lifter 86 shown in FIGS. 8-10 has the ability to accommodate a larger variety of valve box covers than the valve box cover lifter 18 shown in FIGS. 1-7.

Figure 11:
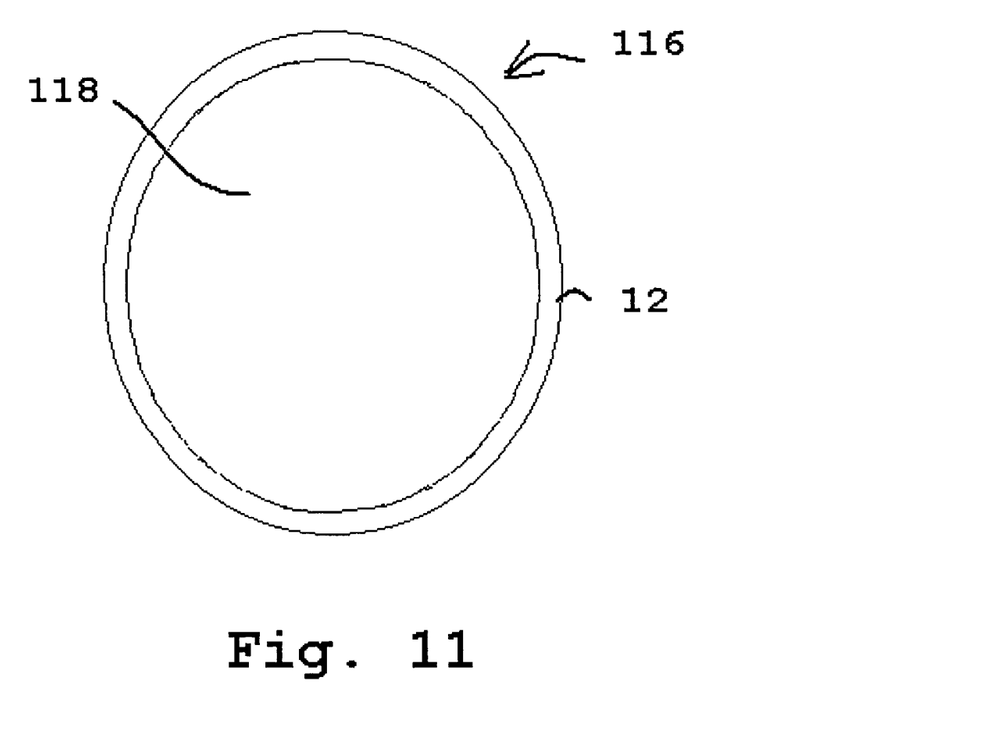
FIG. 11 is a top plan view of a valve box having a notchless valve box cover.

Referring now to FIG. 11, there is shown another type of valve box 116 and valve box cover 118 in which like elements are identified by like numerals shown in FIG. 1. Unlike the valve box cover 14, shown in FIG. 1, the valve box cover 118 does not include notches 16.

Figure 12:
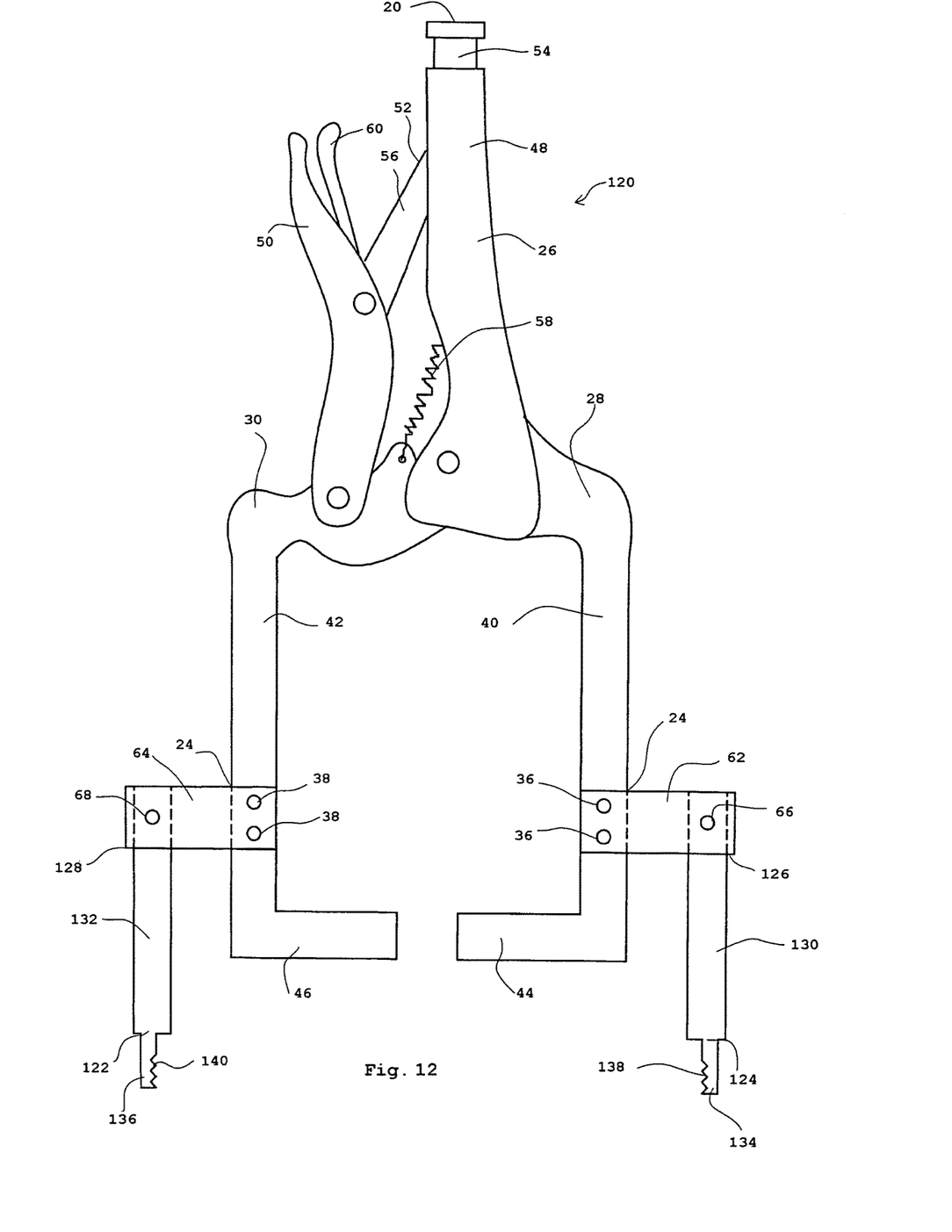
FIG. 12 is a view in side elevation of another embodiment of a valve box cover lifter with serrated gripping surfaces.

Referring now to FIG. 12, there is shown another embodiment of a valve box cover lifter generally designated by the numeral 120 in which like elements are identified by like numerals shown in FIGS. 1-10. The valve box lifter 120 includes a clamping portion 20 with a pair of opposing L-shaped legs 28, 30 extending downwardly therefrom. The legs 28, 30 connect to the members 62, 64 with the fasteners 36, 38 in a permanent or releasable manner. Alternatively, the legs 28, 30 connect to the members 62, 64 through welding, adhesives, or, any other suitable joining manner.

Unlike the embodiment shown in FIGS. 1-7, each connecting member 62, 64 connects to a lifting mechanism 122, 124 shown in FIG. 12. Each lifting mechanism 122, 124 is essentially an elongated portion 130, 132 having a claw 134, 136 with a gripping surface 138, 140. The gripping surfaces 138, 140 include a plurality of serrations to facilitate gripping the cover 118 shown in FIG. 11.

It should be understood that while the legs 28, 30, the lugs 32, 34, and the connecting members 62, 64 shown in FIGS. 2-7 are illustrated having fixed dimensions, other embodiments are contemplated in which the legs 28, 30, the lugs 32, 34, and the connecting members 62, 64 have adjustable dimensions.

It should also be understood that while the valve box cover lifter 86 shown in FIGS. 8-10 includes elongated members 96, 98 that are threadedly mounted within the connecting members 92, 94, other embodiments are contemplated in which the elongated members 96, 98 are rotatably mounted within the connecting members 92, 94 through any suitable fastening method.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A lifting device for removing a cover from a valve box comprising:
   a clamp having a fixed handle, a movable handle, a releasable mechanism connecting said fixed handle to said movable handle, and a pair of legs extending from said fixed and movable handles, respectively,
   said movable handle pivotal between an open position relative to said fixed handle and a closed position relative to said fixed handle,
   a lug connected at a selected position along the length of each of said legs, said lug extending laterally and outwardly from each of said legs,
   a lifting mechanism connected to said lug to extend laterally outwardly from each leg, and
   said lifting mechanism engaging the cover of the valve box upon pivotal movement of said movable handle to the closed position to hold said legs in a fixed position relative to one another as said clamp lifts said lugs to remove the valve box cover from the valve box.

2. A lifting device as set forth in claim 1 which includes:
   said clamp having the ability to accommodate a plurality of lugs of predetermined dimensions.

3. A lifting device as set forth in claim 1 which includes:
   said clamp having the ability to accommodate a plurality of legs of predetermined dimensions.

4. A lifting device as set forth in claim 3 which includes:
   said legs having a preselected length extending from said fixed and movable handles.

5. A lifting device as set forth in claim 1 which includes:
   a releasable mechanism connecting said fixed handle to said movable handle to hold said movable handle in a fixed position relative to said fixed handle when said movable handle is in the closed position.

6. A lifting device as set forth in claim 1 in which:
   said lifting mechanism includes an elongated member having a gripping surface for engaging the valve box cover for removal from the valve box.

7. A lifting device as set forth in claim 1 which includes:
   said clamp being a mechanism from the group consisting of locking pliers, vise grips, and C clamps.

8. A lifting device as set forth in claim 1 which includes:
   said lugs including high strength material.

9. A lifting device as set forth in claim 1 which includes:
   said movable handle being pivotally connected to one of said legs, and
   said fixed handle being integral with said other leg.

10. A lifting device as set forth in claim 1 in which:
    said lug includes an elongated member being rotatable relative to said leg for selective positioning of said lifting mechanism to engage the valve box cover.

11. A lifting device as set forth in claim 10 which includes:
    a threaded connection of said elongated member to said leg for movement of said elongated member laterally on said leg.

12. A lifting apparatus for removing a cover from a valve box comprising:
    a clamping mechanism having a gripping portion, a pair of lifting portions, and a connecting portion for connecting said gripping portion to said lifting portions,
    said gripping portion including a fixed handle, a releasable handle pivotally connected to said gripping portion, and means for locking said releasable handle relative to said fixed handle,
    each lifting portion having a surface for gripping the valve box cover,
    said connecting portion having a pair of legs extending from said gripping portion, means for attaching said lifting portion to said legs to position said lifting portion laterally outwardly from said legs, said releasable handle being movable relative to said fixed handle to move said lifting portion surfaces into and out of engagement with the cover, said releasable handle being movable relative to said fixed handle to hold said lifting portions positioned laterally of said legs in a fixed position relative to one another for engagement with the cover, and said fixed handle being movable relative to the valve box with said lifting portion surfaces engaged to the cover to separate and lift the cover from the valve box.

13. A lifting apparatus as set forth in claim 12 which includes:

said connecting portion having the ability to accommodate a plurality of legs of predetermined dimensions.

14. A lifting apparatus as set forth in claim 13 which includes:

said legs having a preselected length extending from said gripping portion.

15. A lifting apparatus as set forth in claim 12 which includes:

said lifting portion surface having serrations.

16. A lifting apparatus as set forth in claim 12 which includes:

said clamping mechanism includes a high strength material.

17. A lifting apparatus as set forth in claim 12 which includes:

said gripping portion being pivotally connected to one of said legs, and said fixed handle being integral with said other leg.

\* \* \* \* \*